(12) United States Patent
Gerdes

(10) Patent No.: US 6,745,569 B2
(45) Date of Patent: Jun. 8, 2004

(54) POWER GENERATION PLANT WITH COMPRESSED AIR ENERGY SYSTEM

(75) Inventor: Ralf Gerdes, Untersiggenthal (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 10/042,307

(22) Filed: Jan. 11, 2002

(65) Prior Publication Data

US 2003/0131599 A1 Jul. 17, 2003

(51) Int. Cl.$^7$ ............................. F02C 1/00; F02G 3/00
(52) U.S. Cl. ....................... 60/727; 60/728; 60/39.183
(58) Field of Search ...................... 60/727, 728, 39.183

(56) References Cited

U.S. PATENT DOCUMENTS

| | | | | |
|---|---|---|---|---|
| 3,866,058 A | * | 2/1975 | Lenssen | 290/52 |
| 4,249,371 A | | 2/1981 | Romeyke | |
| 4,441,028 A | | 4/1984 | Lundberg | |
| 4,522,024 A | * | 6/1985 | Zaugg | 60/775 |
| 4,630,436 A | * | 12/1986 | Frutschi | 60/39.183 |
| 5,379,589 A | * | 1/1995 | Cohn et al. | 60/39.59 |
| 5,495,709 A | | 3/1996 | Frutschi | |
| 5,778,675 A | | 7/1998 | Nakhamkin | |
| 6,276,123 B1 | | 8/2001 | Chen et al. | |
| 6,305,158 B1 | | 10/2001 | Nakhamkin et al. | |

FOREIGN PATENT DOCUMENTS

| | | |
|---|---|---|
| FR | 2.224.642 | 10/1974 |
| GB | 1 416 238 | 12/1975 |
| JP | 8-128331 | 5/1996 |
| WO | 00/01934 | 1/2000 |

* cited by examiner

*Primary Examiner*—Justine R. Yu
*Assistant Examiner*—William H. Rodriguez
(74) *Attorney, Agent, or Firm*—Burns, Donae, Swecker & Mathis, L.L.P.

(57) ABSTRACT

A power generation plant with a compressed air energy storage system comprises a means to reduce the pressure of air extracted from a compressed air storage cavern for the use in a combustion turbine. The means to reduce the air pressure comprises at least one expansion turbine and means to control the size of pressure reduction. Furthermore, the expansion turbine is arranged on a rotor shaft that drives a generator. The means for pressure redact, according to the invention, avoid power losses and provide an increased overall efficiency of the power generation plant.

12 Claims, 5 Drawing Sheets

POWER GENERATION PLANT WITH COMPRESSED AIR ENERGY SYSTEM

FIELD OF THE INVENTION

The invention pertains to a power generation plant comprising a combustion turbine and a compressed air energy system (CAES) with an air storage cavern and in particular to a means for the reduction of the pressure of air extracted from the storage cavern.

BACKGROUND OF THE INVENTION

A typical power generation plant with a compressed air energy storage (CAES) system and a combustion as well as an air turbine is shown in FIG. 1. The CAES system comprises a cavern 1 underground, which stores air compressed by a compressor train 2 to a pressure of about 60 to 100 bar. A feed line 3 leads from the cavern 1 to a throttling valve 4, which reduces the air pressure to about 60 bar. The feed line 2 then leads to a heat exchanger or recuperator 5, where the air is preheated, and continues to a turbine train comprising an air turbine 6, a standard gas turbine 7, and a generator G. The air expands in the expansion air turbine 6 and exits through the turbine outlet at a pressure of approximately 15 bar. It then passes through a combustor 8 before entering the standard gas turbine 6. The exhaust gases from the standard gas turbine 7 are passed through a duct burner 9 and used to preheat the air in the recuperator 5 by known methods. At the outlet from the recuperator the exhaust gas pressure is about 1 bar.

The operation of this CAES system for power generation entails energy losses, which result in a loss in power that could have been generated by the plant. The energy losses occur in the throttling of the pressure of the cavern air in the form of heat generated in the valve 4. The air pressure reduction also represents a loss of some of the potential energy, which was put into the system by the compressor train 2 in order to store the air at cavern pressure. Such losses could be decreased by a reduction of the cavern pressure either by decreasing the mass of the air stored in the cavern or by increasing the volume of the cavern. However, a decrease in stored air mass would result in a shortening of the possible plant operation time using the stored air to supplement the air provided by the compressor for the combustion turbine. Furthermore, an increase in the cavern volume is rarely an economically feasible solution.

A CAES system can also be implemented in power generation plants with a standard gas turbine and a combustion turbine compressor. The CAES system is operated in order to supplement the compressed air, which is normally provided by the combustion turbine compressor. Such a gas turbine operated with a supplemental compressed air supply is disclosed in WO 00/01934. Referring to FIG. 2 of that disclosure, such a power generation plant comprises a combustor C, a gas turbine 16, a compressor 14, and generator G, which are connected to a system 10 that provides supplemental air during periods of peak power demand. The air supply system 10 comprises an air cavern 28, a compressor train 32 for compressing the air to be stored, throttling valves 54, 55, 56, which reduce the pressure of the air extracted from the cavern 28. The air is led, via a recuperator 52, to the combustor C and gas turbine 16.

The pressure of the air extracted from the cavern must be matched to a pressure suitable for the combustor, which is typically in the range between 10 and 20 bars. For this, the relatively high cavern air pressure of 60 to 100 bars is throttled by means of valve 54. The throttling, however, causes an overall power loss in the power generation system. Such throttling losses could be decreased by methods as described above in connection with FIG. 1. Again however, neither of these methods is an economically feasible solution.

A power generation plant with a CAES system requires the pressure of the air when it is extracted from the storage cavern to be reduced to 10–20 bar, which is a suitable air pressure for the operation of a combustion turbine. The air pressure in the cavern varies greatly within a range from 60 to 100 bars for example. This pressure range is of much greater size than is typically encountered in a standard power generation plant. In a standard steam turbine power plant, for example, the pressure from the boiler remains within a small range and the steam turbine is designed for that particular small pressure range. In a standard gas turbine power plant operating with a combustion turbine compressor only, the pressure of the air compressed by the compressor is within a small range that is suitable for the operation of the combustion turbine. Hence, pressure reduction schemes found in standard steam and combustion turbine systems are not readily applicable to a power generation plant with compressed air storage or supplemental air as discussed in this background art.

SUMMARY OF THE INVENTION

In view of the described background art, it is an object of the invention to provide a power generation plant having a compressed air energy storage system with a means to reduce the pressure of air extracted from a compressed air storage cavern with varying pressure for the use in a turbine or turbine train. In particular, the pressure of the extracted air must be reduced to a level suitable for the operation of a combustion turbine. In view of the background cited, the means for pressure reduction should avoid power losses and provide an increased efficiency of the power generation plant as a whole.

A power generation plant comprises a compressed air energy system with a cavern for the storage of compressed air, at least one combustion turbine or a turbine train with at least one air turbine and at least one combustion turbine, which drive a generator on a rotor shaft, and means to reduce the pressure of the air that is extracted from the storage cavern for the use in the turbine train or combustion turbine.

According to the invention, the means for reducing the pressure of air extracted from the storage cavern comprises at least one expansion turbine, which is arranged on a rotor shaft that drives a generator. This at least one expansion turbines is additional to the combustion turbine or turbine train. Furthermore, the expansion turbine has means to control the size of the pressure reduction.

The means for pressure reduction by an expansion turbine enables primarily a pressure reduction of the size necessary (from a range from 100 bars to 60 bars down to about 20 bars) in a power plant with a CAES system or a standard turbine operated with supplemental compressed air stored in a cavern. The power generation plant with this type of pressure reduction has the advantage over plants of the state of the art in that it avoids the energy losses caused by conventional throttling valves. Instead, the energy, which otherwise is lost in the process of pressure reduction, directly drives the generator. Furthermore, the pressure reduction system according to the invention allows the storage of the same mass of air at a same pressure as in systems of the state of the art. This in turn allows an operation of the power generation plant using compressed air from the cavern over a period of time that is not limited by a reduction of mass or pressure of the cavern air. Furthermore, a cavern of same size may be used.

In a first embodiment of the invention, the means for reducing the pressure of the air extracted from the cavern comprises several additional expansion turbines arranged preceding the turbine train or at least one combustion turbine. Several inlet lines are arranged to connect a feed line from the air cavern to each of the expansion turbines, each inlet line having a valve. Different settings of the valves allow a pressure reduction of various size, as for example by an expansion in just one expansion turbine, in some, or all the expansion turbines consecutively.

In a second embodiment of the invention, the means for pressure reduction comprises one single expansion turbine having several extraction lines leading to the turbine train or combustion train, each extraction line having a valve. The several extraction lines with a valve allow an air pressure reduction by an expansion in the entire expansion turbine or in a section of various size of the turbine.

In a third embodiment of the invention, the means for pressure reduction comprises one single expansion turbine having several inlet lines leading from a feed line from the storage cavern to different sections of the turbine, each inlet line having a valve. According to the setting of the valve in each inlet line, the extent of air expansion and size of pressure reduction can be varied.

The means for pressure reduction according to the several embodiments of the invention described above are, in a first variant, arranged on the rotor shaft of the combustion turbine of the power generation plant, where in particular, the rotor shaft of the one or several additional expansion turbines are disengageable from the rotor shaft of the combustion turbine.

In a second variant of the several embodiments of the invention, the one or several additional expansion turbine for pressure reduction are arranged on the rotor shaft of the combustion turbine, where in particular, the rotor shaft of the expansion turbine is permanently engaged with the rotor shaft of the combustion turbine.

In a third variant of the several embodiments of the invention, the one or several additional expansion turbines of the pressure reduction system are arranged on a rotor shaft that is separate from the rotor shaft of the combustion turbine and that drives an additional generator.

In the various embodiments of the invention mentioned above, the air from the cavern is led to the expansion turbine, in which case it operates as an expansion air turbine.

In a further embodiment of the invention, a combustor is arranged preceding the additional expansion turbine. The air from the cavern is first led through the combustor and then on to the expansion turbine, in which case it operates as a combustion turbine.

In yet further embodiments of the invention, the air from the cavern is led either directly, or via a heat exchange apparatus of any kind, such as a recuperator, to the expansion turbine. In both cases the expansion turbine is either an expansion air turbine or a combustion turbine.

The various embodiments and variants of the invention can be implemented in a power generation plant with a typical CAES system, where the generator is driven by an air turbine and a combustion turbine.

They can also be implemented in a power generation plant comprising a standard combustion turbine with a combustion turbine compressor and a CAES system that provides supplemental compressed air from a storage cavern during times of high power demand.

BRIEF DESCRIPTION OF THE DRAWINGS

FIGS. 1 through 4 each show a schematic of a CAES system that is part of a power generation plant, of which FIG. 1 shows the CAES system with a throttling valve according to the state of the art, FIG. 2 shows the CAES system with several additional expansion air turbines according to the first embodiment of the invention, FIG. 3 shows the CAES system with one additional expansion air turbine having several extraction lines for pressure reduction of various size according to the second embodiment of the invention, FIG. 4 shows the system with one additional expansion air turbine having several inlet lines for pressure reduction of various size according to the third embodiment of the invention.

FIG. 5 shows a first variant of the invention, in which the expansion air turbine is arranged on the same rotor shaft as the gas turbine. The expansion air turbine can be disengaged from the rotor of the gas turbine, FIG. 6 shows a second variant of the invention, in which the expansion air turbine is permanently arranged on the rotor shaft of the gas turbine, FIG. 7 shows a third variant of the invention, in which the expansion air turbine is arranged on a separate rotor shaft that drives an additional generator.

DETAILED DESCRIPTION OF THE INVENTION

Figure 1:
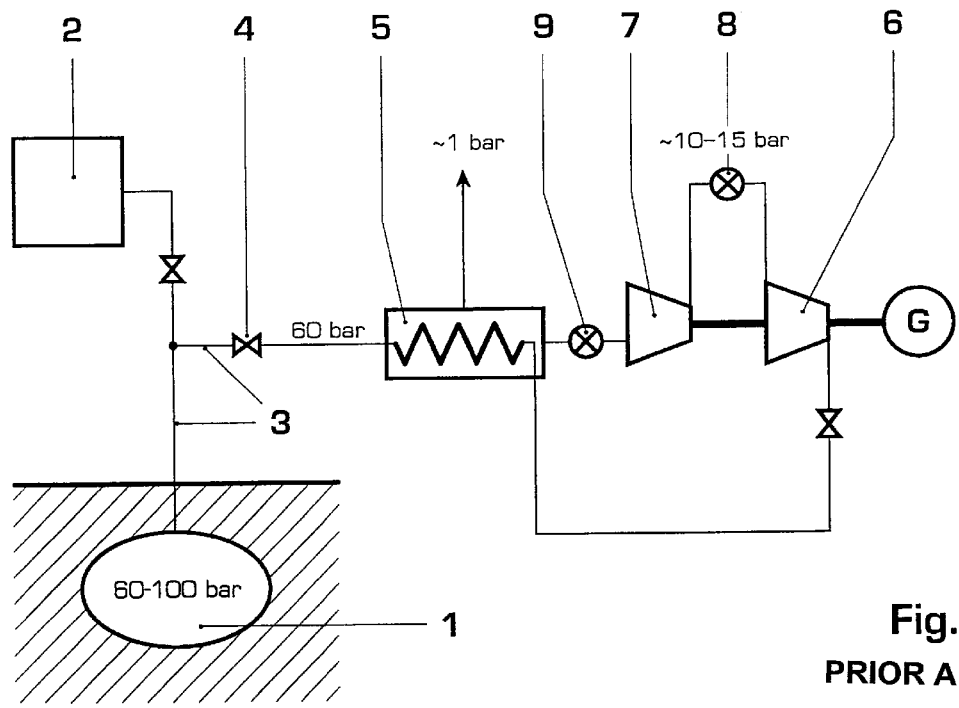

FIG. 1 is described above in connection with the background art.

Figure 2:
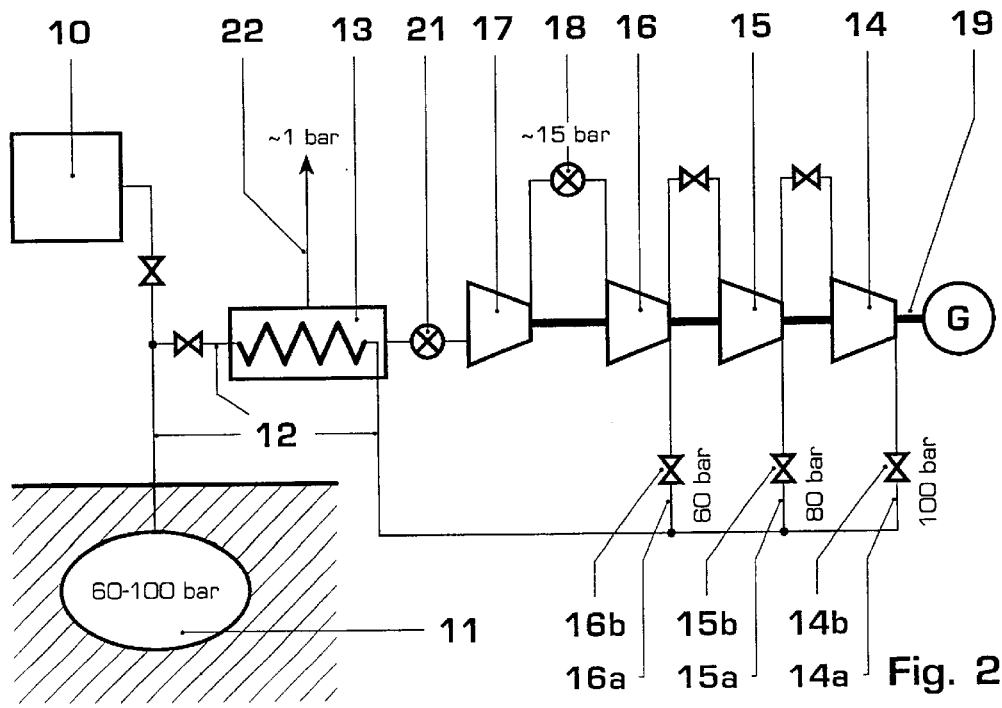

FIG. 2 shows a power generation plant with a CAES system comprising a compressor train 10 that compresses air to a pressure of about 60 to 100 bar for storage in a cavern 11. During times of high demand for electric power, air is extracted from the cavern 11 via the feed line 12 and directed through a recuperator or preheater 13. After the recuperator, the feed line 13 continues to a turbine train comprising three expansion air turbines 14, 15, 16 and a gas turbine 17. A combustor 18 is arranged in the line connecting the last air expansion turbine 16 and the gas turbine 17. All turbines are arranged on a rotor shaft 19 that drives a generator G. Each expansion air turbine has an inlet line 14a, 15a, 16a with a valve 14b, 15b, 16b. This valve is in the simplest case a stop valve. Preferably however, it is a control or a valve that combines both the function of a stop and that of a control valve. The valves 14b–16b are set depending on the level of the cavern air pressure and the necessary pressure reduction. In the case of high cavern pressure of 100 bar, valve 14b is opened, while the other valves are kept closed. The air is expanded in expansion air turbine 14, where the air pressure reaches a level of 80 bars at the turbine outlet. In the expansion air turbine 15 the air reaches a pressure of about 60 bars at that turbine outlet. Finally, it is expanded in turbine 16 reaching a pressure of about 15 bars at that turbine outlet. The energy expended in the pressure reduction in each expansion air turbine is directed to driving the generator G.

In the case of medium cavern pressure of 80 bar, the valve 15b is opened respectively, while the other two valves are kept closed. The air is then expanded in turbines 15 and 16, both of which contribute to driving the generator G. In the case of a relative low pressure of 60 bar, valve 16b is opened, while the other two valves are kept closed and the compressed air is expanded in turbine 16 only, which contributes to driving the rotor shaft.

Instead of just one opened valve, more than one of the valves can be opened in a controlled manner. This operation is suitable for normal operation of the turbines. It is especially suitable for start-up and turning off of the turbines in order to cool the turbine.

As a result of the expansion of the compressed air, the air pressure is reduced to a level that is suitable for the operation of the gas turbine 17. The air is led, via a line 20, from the outlet of expansion turbine 16 to the combustor 18 and subsequently to the gas turbine 17. The exhaust gases from the gas turbine are passed through a further auxiliary combustor 21 through the recuperator 13, and finally to a stack 22.

In a variant of this embodiment of the invention, a combustor is arranged in each of the inlet lines 14a, 15a, 16a. The expansion turbines 14, 15, 16 then operate as a combustion turbine.

Figure 3:
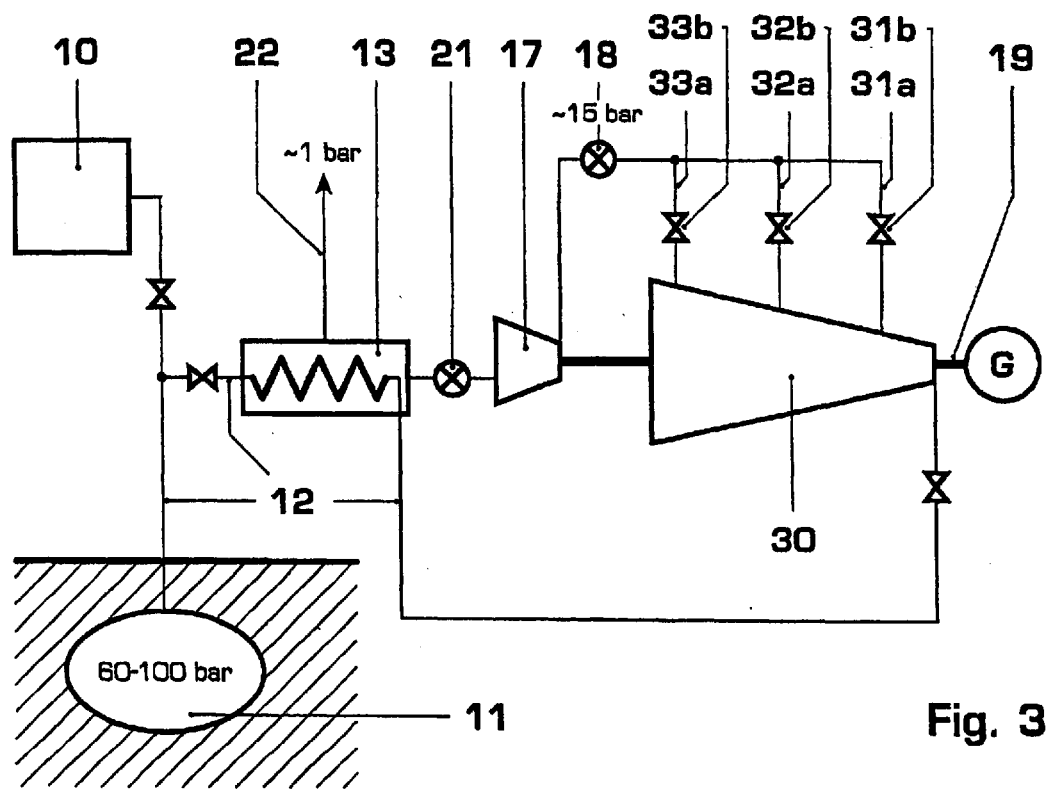

FIG. 3 shows a similar electric power generation plant with a CAES system as in FIG. 2. Same reference numerals pointing to components in this figure signify the same components of the plant in FIG. 2. The compressed air from the cavern 11 is led, via the feed line 12, through the recuperator 13 and on to the inlet of an air expansion turbine 30 having three extraction lines 31a, 32a, and 33a, each with a valve 31b, 32b, and 33b, respectively. The valves 31b–33b are, analogous to the valves in FIG. 2, either stop valves, control valves, or combined stop and control valves. Depending on the level of the cavern air pressure, the valves in the extraction valves are opened or closed in order to expand the air in the turbine and reduce its pressure to about 15 bar as is suitable for the operation of the combustor 18 and gas turbine 17. As a result of the air expansion, the turbine drives the rotor shaft 19 and contributes to the power generation. In case of a high cavern air pressure of about 100 bar, valves 31a and 32a are closed and valve 33a is opened in order to allow the greatest expansion and pressure reduction possible. In case of relative low cavern air pressure of about 60 bar, the valve 31a is opened, while the other two valves are closed. In the case of a medium pressure of about 80 bar, valve 32a is opened. In a further operation mode more than one valve is opened in a controlled manner.

In a variant of this embodiment, a combustor is arranged in the feed line 12 leading to the expansion turbine, which operates as a combustion turbine, for example a gas turbine.

Figure 4:
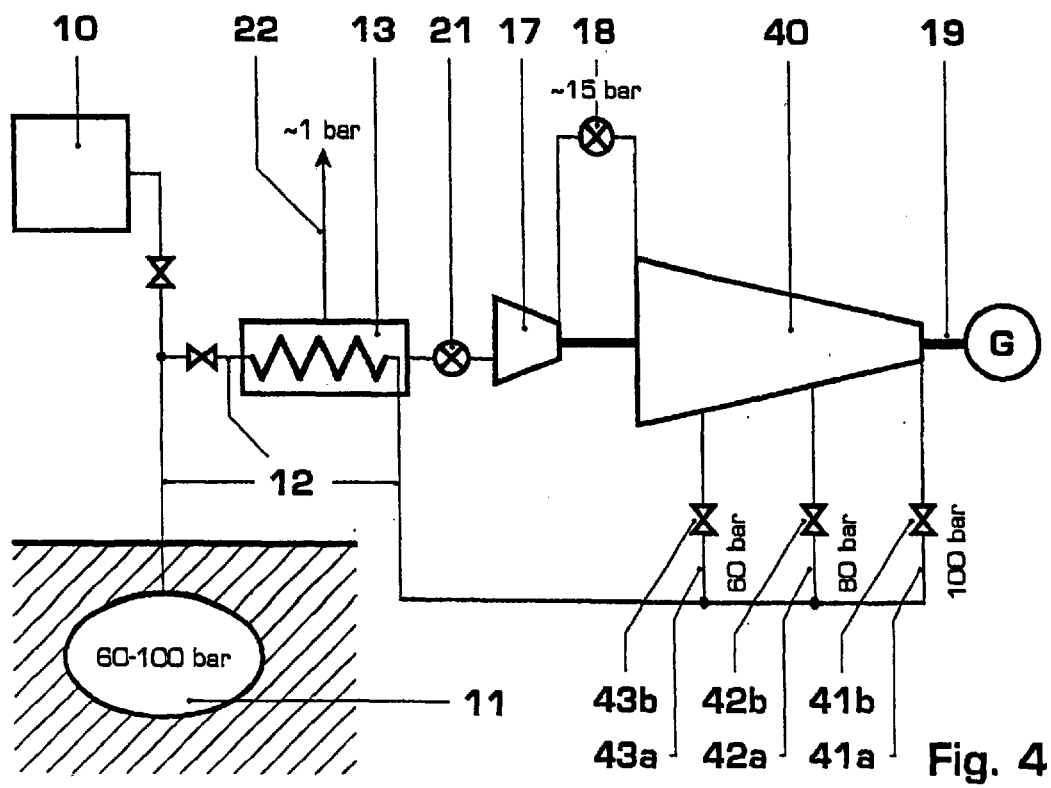

FIG. 4 shows a similar power generation plant with a CAES system as in the FIGS. 2 and 3, where same reference numerals signify same components of a power generation plant of those figures. Compressed air is extracted from cavern 11, via the feed line 12, through the recuperator 13. It is led from there to the inlet of an air expansion turbine 40, which drives the rotor shaft 19. The turbine 40 has three inlet lines 41a, 42a, and 43a, each with a valve 41b, 42b, and 43b, respectively, where the valves are either stop valves, control valves, or combined stop and control valves. The valves are opened or closed depending on the degree of pressure reduction necessary. If the pressure of the cavern air is high at about 100 bar, the valve 41b in inlet line 41a is opened and the air is allowed to expand over the full extent of the air expansion turbine. In similar manner as in FIGS. 2 and 3, valves 42a and 43a are opened in case of medium or relatively low cavern air pressure, respectively. In a further operation mode more than one valve is opened. The air exiting from the expansion air turbine is led to the combustor 18 and on to the gas turbine 17.

In a variant of this embodiment, a combustor is arranged in each of the feed lines 41a, 42a, and 43a. The expansion turbine 40 then operates as a combustion turbine.

Further power generation plants that are similar to those shown in FIGS. 2 through 4 are also possible, as for example, a plant with two combustion turbines instead of an expansion air turbine and one combustion turbine. Furthermore, the power plant can be realised with any kind of heat exchange apparatus in lieu of a recuperator. A further possible realisation comprises no recuperator or heat exchange apparatus.

Figure 5:
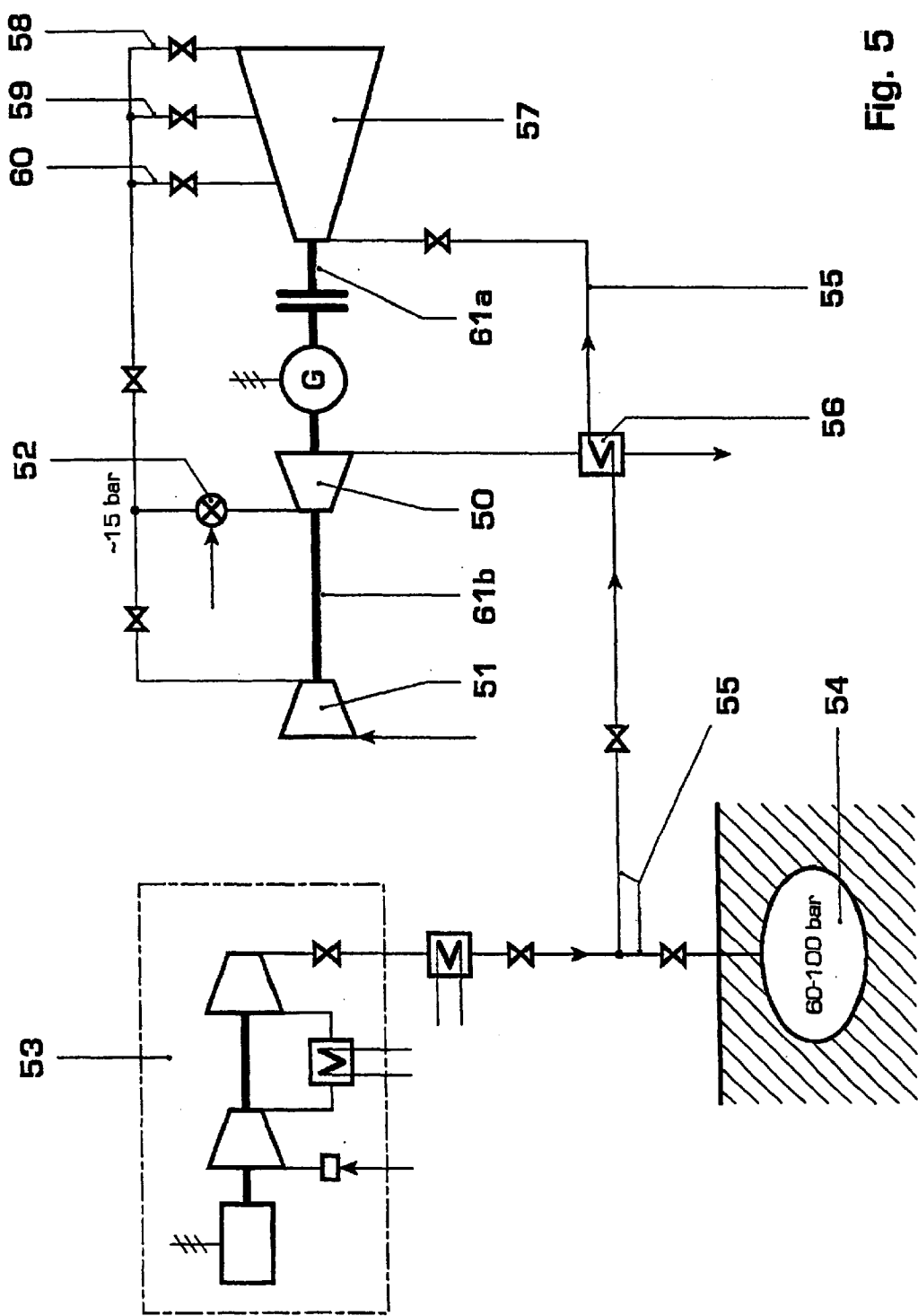
FIGS. 5 through 7 each show a standard gas turbine operating with a supplemental air supply comprising a system for pressure reduction of the air extracted from a cavern and having one additional expansion air turbine with several extraction lines. Of these.

FIG. 5 discloses a first variant of the arrangement of an expansion air turbine for reduction of air pressure with respect to the rotor shaft of the combustion turbine of the power generation plant. The plant shown comprises a standard gas turbine 50, a gas turbine compressor 51 providing compressed air to a combustor 52. The plant comprises a CAES system of known type, as disclosed for example in WO 00/01934 comprising a compressor train 53 and a storage cavern 54 and that supplements the gas turbine system with additional compressed. The compressed air supplementing the gas turbine is led, via an extraction and feed line 55, to a recuperator 56 and to an air expansion turbine 57 of the type shown in FIG. 3 with several extraction lines 58–60. According to this first variant, the expansion turbine 57 is arranged on a rotor shaft 61a, which can be engaged or disengaged from the rotor shaft 61b of the gas turbine 50 and compressor 51, which drives the generator G. In this configuration, the air expansion turbine 57 can be disengaged from the gas turbine in the case that no supplemental air is provided to the system, thus minimising losses caused by the rotation of the turbine 57.

In lieu of the air expansion turbine 57, a turbine train of the type shown in FIG. 2 or a turbine of the type shown in FIG. 4 may also be arranged in this configuration such that it is engageable with the rotor shaft 61a.

Figure 6:
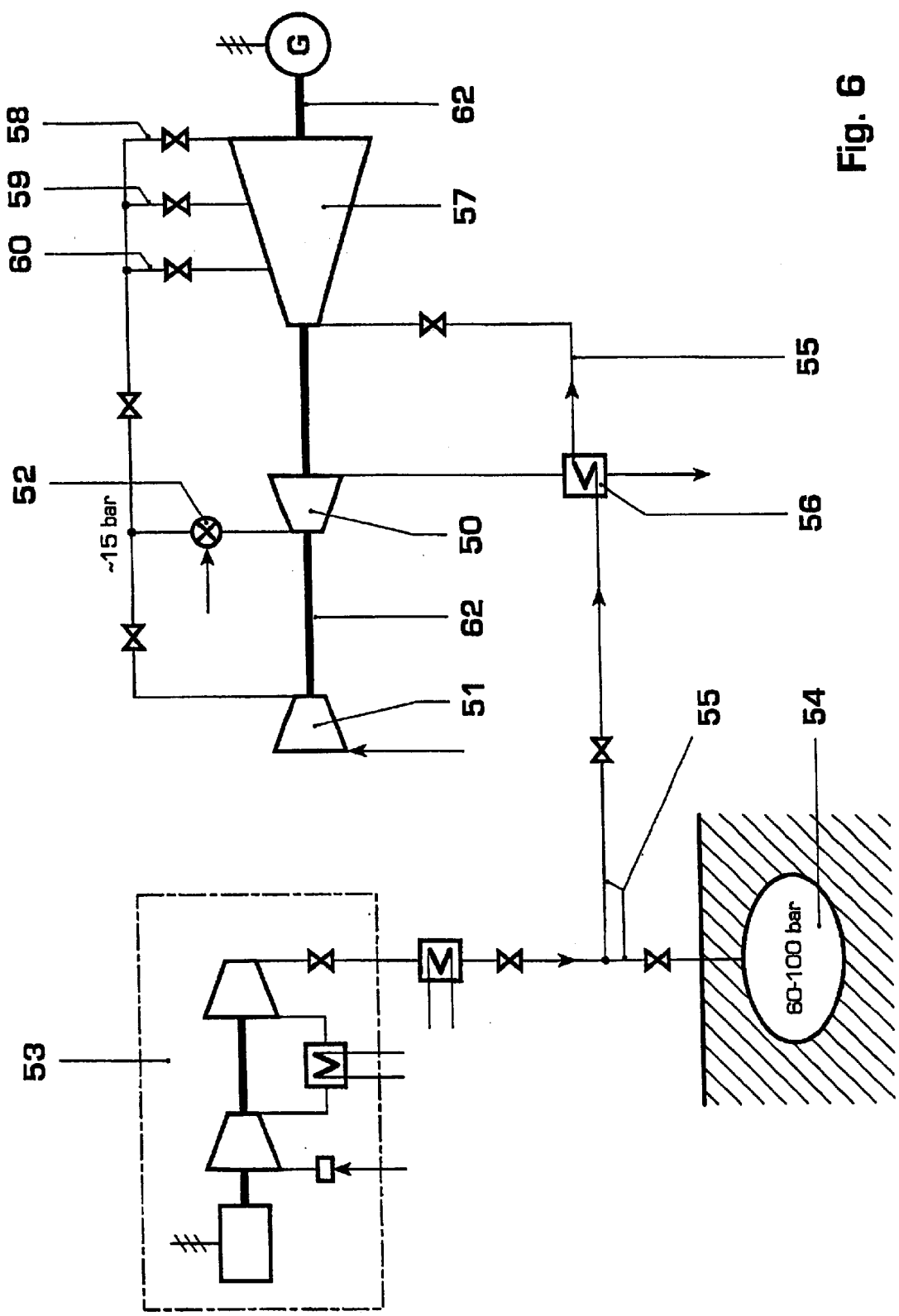

FIG. 6 shows the same type of power generation plant as shown in FIG. 5 with a system for supplementing compressed air to a gas turbine. Same reference numerals in this FIG. 6 correspond to same components described in FIG. 5. According to this second variant of the invention, the air expansion turbine 57 is permanently engaged with the rotor shaft 62 of the gas turbine 50 and compressor 51 that drive the generator G. In this configuration, the air expansion turbine 57 rotates along with the gas turbine at all times, even when no supplemental compressed air is provided to the turbines. In lieu of the turbine 57, a turbine train according to FIG. 2 or a turbine as disclosed in FIG. 3 may be arranged such that it is permanently engaged with the rotor shaft 62 of the gas turbine 50.

Figure 7:
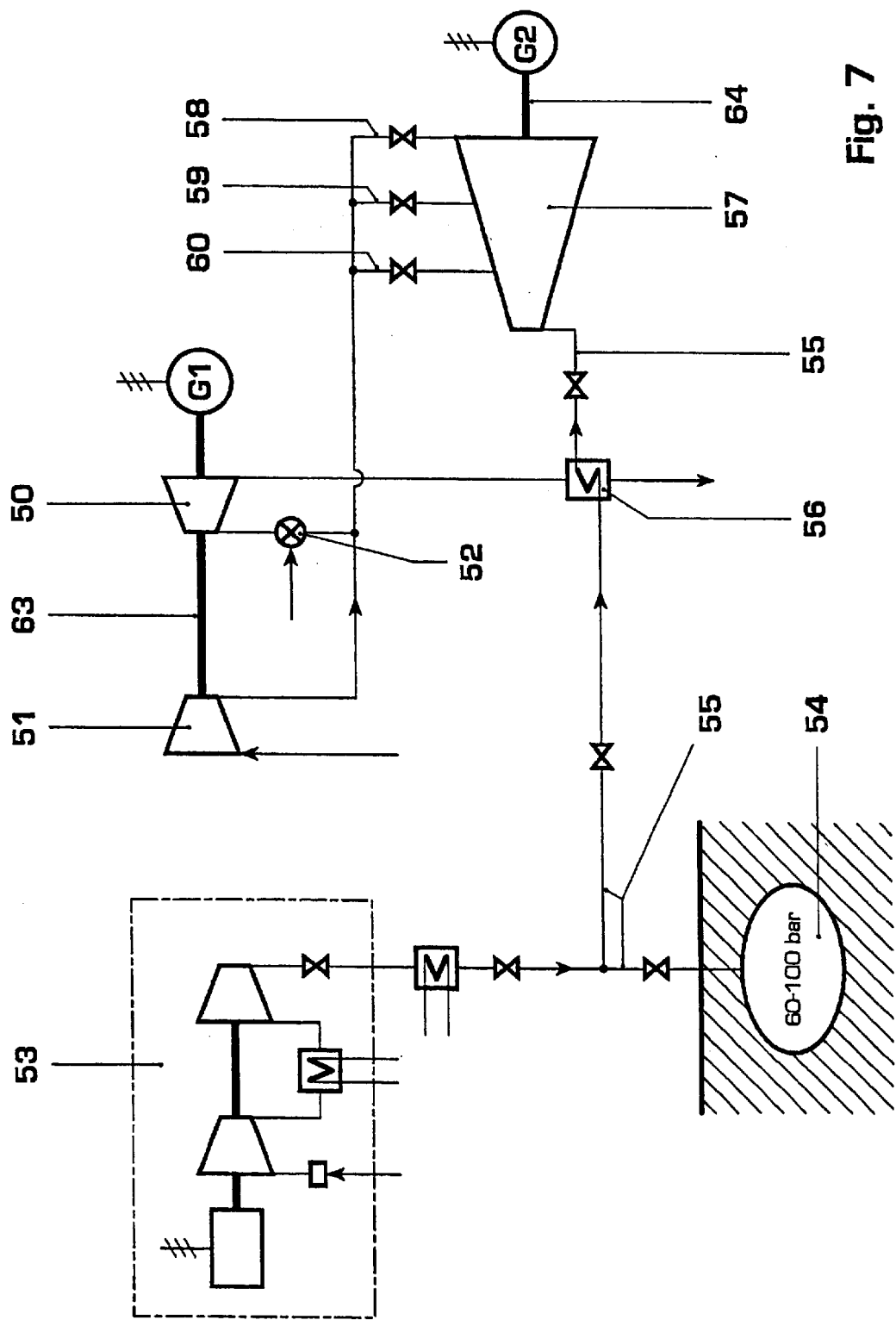

FIG. 7 shows a the same type of power generation plant as shown in FIGS. 5 and 6 and a third variant of the arrangement of the air expansion turbine 57 for air pressure reduction. In the configuration shown, the combustion turbine 50, compressor 51, and a first generator G1 are arranged on a first rotor shaft 63. The expansion air turbine 57 is arranged on a second rotor shaft 64, which drives a second generator G2. This configuration allows a complete disengagement of the power generation using the gas turbine 50 and that using the additional expansion air turbine 57.

What is claimed is:

1. A power generation plant comprising a compressed air energy storage system with a cavern for the storage of compressed air, at least one combustion turbine arranged on a first rotor shaft that drives a first generator, and means for reducing the pressure of air extracted from the air storage cavern for the use in the at least one combustion turbine wherein the means for reducing the pressure of the extracted air comprises one or several expansion turbines arranged on the first rotor shaft or on a second rotor shaft that drives a second generator and several lines, each of the several lines having a valve, and the several lines being arranged in parallel to one another and all lines lead from the air storage cavern to the one or several expansion turbines or the several lines arranged in parallel to one another each lead from a different section of the one expansion turbine to the at least one combustion turbine.

2. A power generation plant according to claim 1 wherein the means for reducing the pressure of the extracted air comprises several expansion turbines and the several lines are inlet lines connecting a feed line from the air storage cavern and each of the several expansion turbines, and the inlet of each of the expansion turbines.

3. A power generation plant according to claim 1 wherein the means for reducing the pressure of the extracted air comprises one expansion turbine and the several lines are inlet lines, each connecting a feed line from the air storage cavern and a different section of the expansion turbine, and each inlet line having a valve.

4. A power generation plant according to claim 1 wherein the means for reducing the pressure of the extracted air comprises one expansion turbine and the several lines are extraction lines, each extraction line connecting a different section of the one expansion turbine and the at least one combustion turbine, and each extraction line having a valve.

5. A power generation plant according to claim 1 wherein each valve is either a stop valve, a control valve, or a combined stop and control valve.

6. A power generation plant according to claim 1 wherein the second rotor shaft, on which the one or several expansion turbines are arranged, is engageable with the first rotor shaft driven by the at least one combustion turbine.

7. A power generation plant according to claim 1 wherein the second rotor shaft of the one or several expansion turbines is permanently engaged with the first rotor shaft of the at least one combustion turbine.

8. A power generation plant according to claim 1 wherein the one or several expansion turbines are expansion air turbines.

9. A power generation plant according to claim 1 wherein the one or several expansion turbines are a combustion turbine with a combustor arranged preceding the at least one combustion turbine.

10. A power generation plant according to claim 9 wherein the combustion turbine is a gas turbine arranged on a rotor shaft with a gas turbine compressor, and the gas turbine is supplied with compressed air from the gas turbine compressor that is supplemented by compressed air from the storage cavern.

11. A power generation plant according to claim 1 wherein the at least one combustion turbine is a gas turbine that is supplied with compressed air from the storage cavern.

12. A power generation plant according to claim 1 wherein a heat exchange apparatus is arranged between the air storage cavern and the one or several expansion turbines.

* * * * *